April 12, 1966     G. WAMBACH     3,246,217
MINIATURE TRIMMER CAPACITOR
Filed Jan. 21, 1965     6 Sheets-Sheet 1
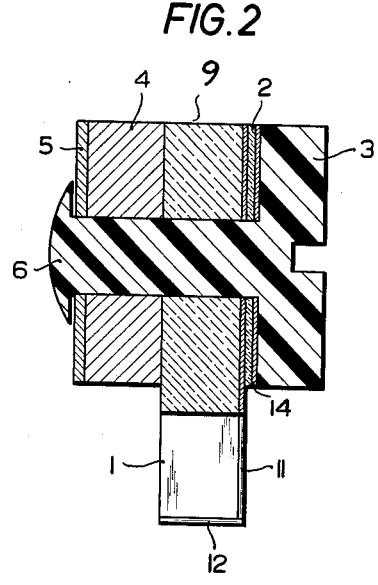
INVENTOR:
GÜNTHER WAMBACH April 12, 1966   G. WAMBACH   3,246,217
MINIATURE TRIMMER CAPACITOR
Filed Jan. 21, 1965   6 Sheets-Sheet 2

INVENTOR
GÜNTHER WAMBACH
by: *Stephen A. Frishauf*
ATTY

April 12, 1966 G. WAMBACH 3,246,217
MINIATURE TRIMMER CAPACITOR
Filed Jan. 21, 1965 6 Sheets-Sheet 3

INVENTOR:

GÜNTHER WAMBACH

INVENTOR:
GÜNTHER WAMBACH

United States Patent Office 3,246,217
Patented Apr. 12, 1966

3,246,217
MINIATURE TRIMMER CAPACITOR
Günther Wambach, Lauf, Pegnitz, near Nurnberg, Germany, assignor to Stettner & Co., Lauf, Pegnitz, Germany
Filed Jan. 21, 1965, Ser. No. 427,066
Claims priority, application Germany, Jan. 28, 1964, St 21,611; Mar. 3, 1964, St 21,777
11 Claims. (Cl. 317—249)

This invention relates to miniature disc type trimmer capacitors, more particularly to subminiature ceramic disc type trimmers.

Disc type trimmer capacitors are known wherein the stator and rotor are interconnected by means of a rotatable spindle and pressed together by spring means. It becomes increasingly difficult for the spindle, the spring means and the two capacitor connections to be received in the available space in proportion as capacitor dimensions are reduced for the sake of circuit compactness. For instance, to obviate eccentric breaks for connections near the spindle, and the associated difficult jobs of machining small and delicate parts, in the case of miniature capacitors which have a generally cylindrical shape and which are below a certain size, it is known to use concentric sheetmetal members which engage around the cylindrical stator member and serve to connect and secure the various items. An example of miniature trimmer condensers of this type is described in U.S. Patent 3,185,904, Gans. As size is reduced even further in the manner required for transistorised devices, for instance, where trimmer disc diameters are 5 mm., it becomes increasingly difficult to manufacture and provide retaining means and connections of this kind, particularly since manufacture is required to be on a substantially automatic flow-line basis.

It is therefore an object of the invention to provide a trimmer capacitor, the parts of which are so shaped that, despite the trend towards smaller physical size, the individual parts are simple to manufacture, can rapidly be assembled on a mass-production basis, and lend themselves to assembly into circuits by means of automatic machinery.

It is a further object of the invention to devise a trimmer having a very small number of very simple parts adapted for rapid assembly on a mass production basis and capable of being soldered by the user or on the assembly line into the assembly panels of chassis, printed circuits, or casings by conventional or automatic methods, without the use of special soldering tags for the connections.

To this end, according to the invention, the stator body terminates for the two connections to the capacitor in a foot or base part. Metal coatings, insulated from one another, are applied over the foot, or base part. The coatings provide the connections to coatings forming the capacitor itself. The connection coatings are preferably thickened, and adapted to be soldered to the capacitor coatings in recesses in the assembly panel. The stator member base part, which can be formed by two peg-like extensions, can be disposed in the plane of the stator disc or at an angle to such plane. The first position, in which the stator and rotor form plane-parallel members devoid of parts projecting from or recessed in the two boundary planes, has the advantage of enabling the parts to be produced very easily by very simple moulding, with very easy provision for grinding, particularly in respect of the thin rotor disc, the spindle being in this case parallel to the standing surface. The number of parts used for the trimmer is small and they are of very simple shape.

The base part, that is, the two peg-like elements formed by the actual stator member, with their thickened soldering surfaces provide strong feet for standing despite their small size, so that the trimmer is very stable, for instance, in printed circuits.

The miniature trimmer hereinbefore outlined can be embodied in various ways, the choice depending upon individual conditions and requirements. One very advantageous embodiment, dispensing with any soldered connection in the capacitor itself uses a pair of stator plates, and a rotor, unconnected to any terminal, variably overlapping both stator plates, in the well known differential circuit arrangement. The rotor is mechanically secured to a spindle which may be of plastic. This differential arrangement was used occasionally in connection with printed circuits, where coatings are disposed on a printed circuit panel, and a rotor disc with several projecting driving ribs is associated therewith. The present invention, however, provides separate component which can be assembled independently into circuits and which has the stator member hereinbefore described. If a plastics spindle, and the differential circuit arrangement is used, all metal connecting means on the rotor can be omitted as can, indeed, all soldered connections, the coatings of the stator base part being conductively connected to two metal coatings disposed on one side of the stator and insulated from one another by an insulating gap. Conveniently, to make the best possible use of the available coated surfaces and to provide a very large capacitance range, the rotor has two metal coatings separated from one another by a narrow insulating gap. This construction has the often very desirable feature that the absence of metal spindle reduces the minimum capacitance. Also, assembly is very simple since there is no need for a metal rotor connection. U.S. Patent 2,693,557, Kodama, illustrates another form of capacitor, capable of being used in differential connection, where a movable electrode section overlaps, more or less, as desired, a pair of stator electrodes.

Another embodiment uses the more conventional, or standard arrangement, that is a capacitor arrangement comprising a metal spindle for the connection of the stator coating. A semi-annular rotor coating is connected by means of a metal spindle to one of the two capacitor connections. The opposite plane surfaces of the stator are each substantially half-covered by connection coatings; one connection coating is in contact with the spindle by means of a washer, or the like, while the other is conductively connected to the stator coating, and formed with a clearance from the spindle. So far as production engineering is concerned, the basic member for the stator can be exactly the same as for the differential circuit arrangement; only the location of the coating will be different. The metal spindle in the standard circuit arrangement must be soldered to some part of the rotor coating, but the complete arrangement is very much simpler than in known standard type miniature trimmers having a hollow plastics spindle through which the rotor connection extends to a soldered junction with a driving slot, the same also being soldered to a sector specially prepared for this purpose on the top of the rotor disc, an arrangement which is complicated and which introduces difficulties for miniature equipment of the physical size described. A special advantage in assembly of standard type miniature trimmers according to the invention is that the rotor coating can be soldered to the spindle when all the parts have already been assembled, that is, when the entire assembly is easiest to handle.

To facilitate the introduction and soldering of such trimmers in automatic and flow-line assembly, according to another feature of the invention, the stator base part bearing the two thickened connection coatings narrows, or tapers on its two outer narrow sides with the formation of trapezoidally terminating coating surfaces on the flat sides. Consequently, the stator slips readily into a recess of appropriate size in the assembly panel, but only to the extent permitted by the taper, simplifying automatic dip soldering. Also, the trapezoidal shape of the base part ensures that the trimmer seats well in the assembly panel, that is the trimmer cannot slip further through the slot in the assembly panel than is appropriate for soldering. This feature also facilitates the maintenance of tolerances.

The solderable thickening of the silvered surfaces can be extended from the bottom end connection faces for some distance along the lateral coating surfaces which extend upwards from the bare surface of the base part. When fitted, the solderable surfaces of the stator should extend at least as far as the bottom edge of the assembly plate.

To make automatic production still more reliable, more particularly in connection with tapered, or bevelled stator base, and to facilitate entry into a circuit board, the stator base part disposed between the two inclined connection parts is formed as a compact block whose central portion has its bottom edge in alignment with the connection coatings. An uncoated insulating gap provides for insulation between coatings. This feature leads to a shape which has excellent mechanical strength, withstands handling very well and which, even if its physical size is very small, is unaffected by mechancial abuse, since the insulating gap between the two connection zones is not an air gap, but a gap made of an insulating material and of a size determined by the unsilvered stator surface between the two silver coatings.

Specific embodiments of the invention will now be described by way of example with reference to the accompanying drawings, in which:

FIG. 1 is an enlarged plan view or elevation of a differential type subminiature trimmer, for example of 5 mm. diameter, embodying the invention;

FIG. 2 is a section taken along the line A–B of FIG. 1;

Figure 3:
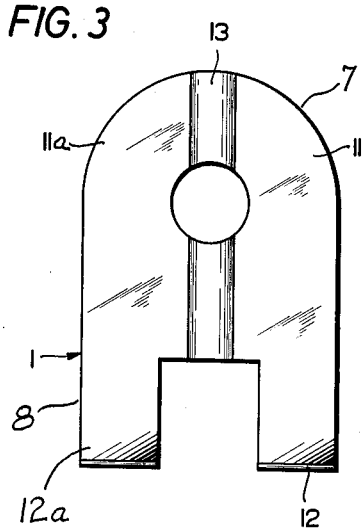
FIG. 3 is a plan view of the associated stator.
Figure 4:
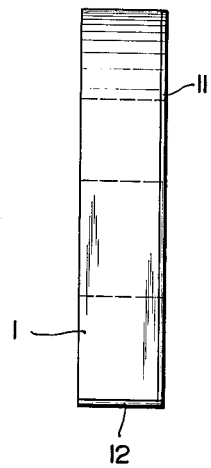
FIG. 4 is a side elevation corresponding to FIG. 3.
Figure 5:
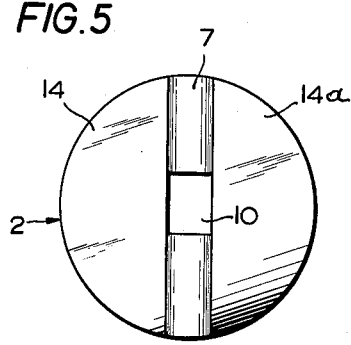
FIG. 5 is a plan view of the association rotor.
Figure 6:
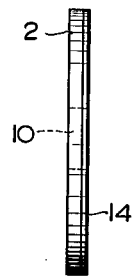
FIG. 6 is a side elevation corresponding to FIG. 5.

The capacitor shown in FIGS. 1 to 6 comprises a ceramic stator 9 in the form of a plane disc having a projecting foot part formed by two separate feet 1, 8 a ceramic rotor 2 in the form of a circular disc, a plastic spindle 3 having an enlarged adjusting head with a screwdriver slot at one end while its other end 6 is beaded over rivet-fashion, a rubber or metal loading spring 4, and a washer 5. On the side near the rotor, the stator has two silver coatings 11, 11a, separated by an insulating gap 13. Coatings 11, 11a continue along feet 1, 8 as solderable thickened, for instance, hot silvered, metal layers 12, 12a which serve as connection coatings, applied on the stator end face and in electrically conductive connection with the coatings 11, 11a. The rotor 2 (FIGS. 5 and 6), in the form of a thin ceramic disc, has two silver coatings 14, 14a, separated from one another by an insulating gap 7. The stator and rotor are each formed with a hole, or passage through which the plastic spindle 3 extends. The spindle passage in the stator is round, but the spindle passage in the rotor shown at 10 (FIG. 5) is preferably polygonal, for example square, in order that the spindle 3 may drive the rotor 2 when rotated. In theory the spindle passage 10 in the rotor could be round, in which case the rotor or its coating 14 must be connected to the end of the spindle 3 by adhesion or the like in order to rotate therewith. If the plastic spindle is extruded, it is easiest for the spindle passage in the rotor to be square. The absence of a metal spindle means that the minimum capacitance of the trimmer in this differential arrangement is very low. A metal spindle, in a trimmer of the standard or conventional arrangement represents a stray capacitance which becomes relatively more noticeable as the physical dimensions of the trimmer are reduced, as the spacings between the coatings become smaller and smaller, and the ratio of minimum capacitance to full capacitance becomes less.

The plastic spindle is made of a low-loss material with satisfactory electrical properties, such as a polystyrene. The material is thermoplastic, and the rivet-like end 6 may be upset or headed after the components have been assembled.

The stator and rotor are made of a ceramic, in order that it may have the required dimensional stability and may readily be provided with durable metal coatings. The substance used depends upon the required dielectric constant and upon temperature coefficients. Silicone rubber or a metal cup can be used for the washer 4.

Figure 7:
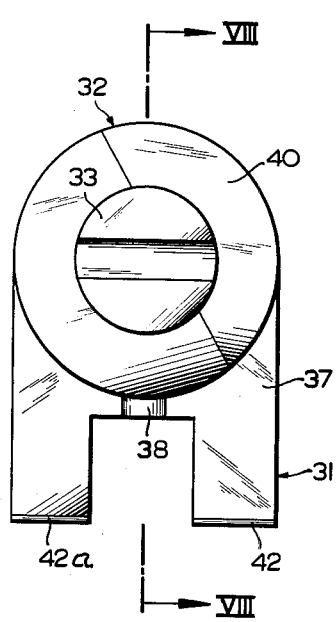
FIG. 7 is a plan view or side elevation of another embodiment of the trimmer, this time in a standard arrangement.
Figure 8:
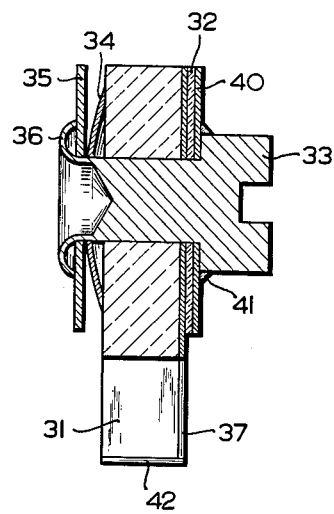
FIG. 8 is a section taken along the line C–D of FIG. 7.
Figure 9:
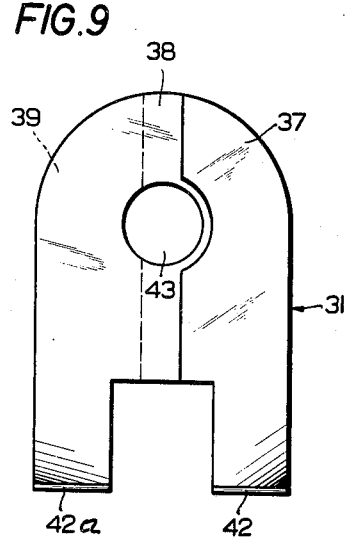
FIG. 9 is a plan view of the stator of the trimmer shown in FIGS. 7 and 8.
Figure 11:
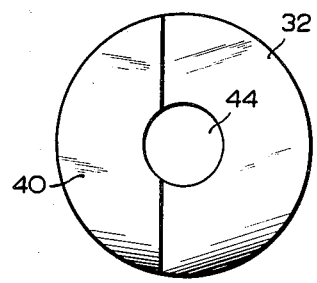
FIG. 11 is a plan view of the associated rotor.
Figure 10:
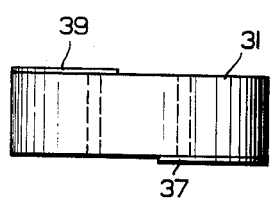
FIG. 10 is a corresponding end-on-view from below.
Figure 12:
FIG. 12 is a corresponding side view.

A trimmer condenser having standard or conventional circuit arrangement is represented by the embodiment shown in FIGS. 7 to 12. The basic form of the stator and rotor parts is the same as for the embodiment shown in FIGS. 1 to 6. The ceramic stator 31 has two feet with thickened or reinforced metal coatings 42, 42a, and is formed with a round passage 43 (FIG. 9) for a metal spindle 33. Half of each plane surface of the stator 31 has a respective silver coating 37, 39; the coating 37 which is not connected to the rotor coating is spaced a small distance from the hole 43 for the spindle, leaving also a gap 38 as shown (FIGS. 7 and 9). A ceramic rotor disc 32, which may be formed with a round hole 44 for the spindle, bears a silver coating 40 forming one side or coating of a capacitor. The coating 40 is conductively connected by a soldered connection 41 (FIG. 8) to the spindle 33, which has a beaded-over part 36 on the other side of the stator and is biased by the cup spring 34 and a washer 35. The top of the spindle 33 is formed with the conventional screwdriver slot. In this construction hole 44 in the rotor disc is preferably round; the metal spindle is soldered to the rotor anyway, and a round spindle is cheaper to produce an automatic screw machines that a polygonal one. Spring 34 bears on the underside, with respect to FIG. 7, or coating 42a, and makes contact therewith. Thus the coating 42a on the left foot portion (FIG. 7) is connected over the spring 34a, washer 35, spindle 36 and solder 41 to coating 40 of the rotor. Relative rotation is provided between washer 35 and spring 34. Spring 34 is preferably stationary with respect to body 31 (for example, by having a punched bump engage in a small recess, not shown), to prevent abrading the coating 42a.

Figure 13:
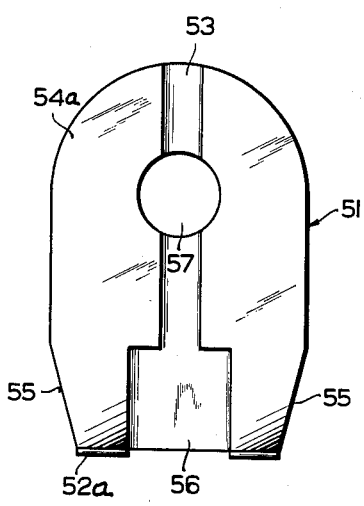
FIG. 13 is an enlarged plan view or elevation of the stator of a modified subminiature trimmer (true diameter for example 5 mm.) in a differential arrangement.
Figure 14:
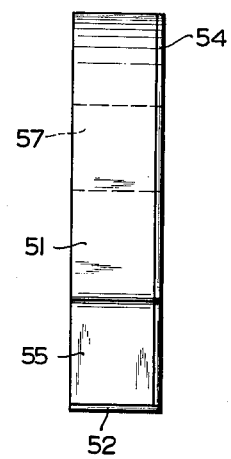
FIG. 14 is a corresponding side view.

FIGS. 13 and 14 illustrate a stator, preferably ceramic, for use in a differential circuit; the compact body 51 has a circular hole 57 for a plastic spindle for a rotor disc of a kind similar to the rotor disc shown in connection with FIGS. 1 to 6. As in FIGS. 1 to 6, the stator has on the side near the rotor two silver coatings 54, 54a, separated by an insulating gap 53, while solderable thickened, for instance hot silvered metal layers 52, 52a, which act as connection coatings are provided on the stator end face and are in electrically conductive connection with the silver coatings 54, 54a.

The bottom of the stator has a tapering, or bevelled foot part 55. The lower zones of the silver coatings 54, 54a, that is, the zones extending as far as the end connection coatings 52, 52a, are trapezoidal in outline, or shape. For increased mechanical strength, the bottom of the stator in this embodiment is a solid piece, or block of material. The insulating gap 53 is extended downwards, leaving a solid but unsilvered central portion 56, which extends down to the plane of the connection zones 52, 52a, that is, between the trapezoidal ends of the coatings 54, 54a. The ends of coatings 52, 52a are preferably reinforced for ease in soldering.

Because of its bevelled or tapered outer, narrow surfaces, a stator body of this kind enables rapid, accurate assembly in a production line operation, and drops readily into apertures in assembly panels, or boards, for automatic dip soldering. The compact shape of the foot or base reduces the risk of damage to the component, however small it may be, during handling and assembly.

Figure 15:
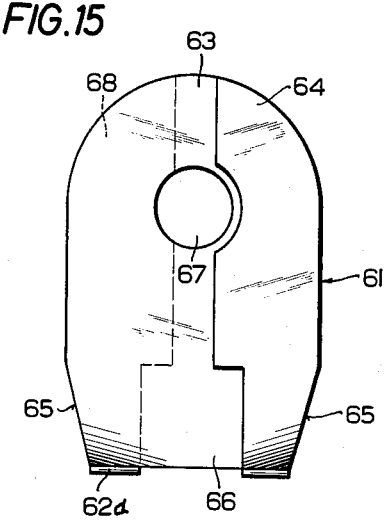
FIG. 15 is an enlarged plan view or elevation of the stator of a modified trimmer in a standard arrangement.
Figure 16:
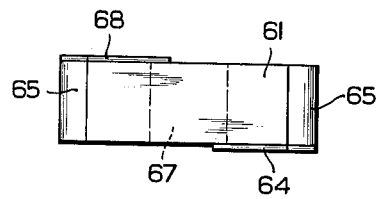
FIG. 16 is a corresponding end view from below.

FIGS. 15 and 16 show the stator of FIGS. 13 and 14 for the standard circuit connection. As in the corresponding embodiment shown in FIGS. 7 to 12, a ceramic stator 61 has thickened metal coatings 62, 62a, for the two capacitor connections and is formed with a circular passage 67 for the spindle. Each of the two plane side surfaces is half covered by silver coatings 64, 68. The coating 64 which will not be connected to the rotor is at a distance 63 from the hole for the metal spindle.

Similar to the embodiment of FIGS. 13 and 14, the stator base has a tapering zone 65 at its two outer narrow sides, so that the bottom zones of the silver coatings 64, 68, that is, the zones which extend down to the thickened connection coatings 62, 62a, are trapezoidal in shape. For improved mechanical strength, the stator base of this embodiment is solid, that is, the insulating gap 63 is extended downwards so that a solid but unsilvered central portion 66 extends right down to the plane of the connecting feet between the connection zones 62, 62a, that is between the trapezoidal ends of the coatings 64 and 68, such ends being preferably thickened for ease in soldering.

The subminiature disc trimmers hereinbefore described have parts which are simple to manufacture despite their small size; the stator and rotor have smooth surfaces free from projecting parts and beaded edges; and the parts are simple to assemble since no preassembly or terminal assembly is necessary. In the case of differential circuit type trimmers (FIGS. 1 to 6, and 13 and 14), the rotor discs are pushed onto a thermoplastic spindle and a head is formed thereon by heating during final assembly. For the Standard Handbook for Electrical Engineers (Mc- and 16), the rotor discs are soldered to the metal spindle only after the complete assembly and beading-over thereon of the other end thereof. The base part of the stator is adapted to be soldered directly into a panel; yet terminals or connection fittings can easily be provided, if required, on the base part.

The materials used in the construction of the trimmer condenser according to the present invention can be ceramics or plastics well known in the condenser art. Materials having the necessary mechanical, stability and electrical characteristics are known; for details, reference may be had, for example to the chapter on Materials of the Standard Handbook for Electrical Engineers (McGraw-Hill Book Company) and specifically to the section on insulating materials. Characteristics of such materials can be determined from appropriate current ASA Standards, for example ASA Standards C 75.1, C 75.2, and C 72.4.

Condensers of 5 mm. rotor diameter in a differential circuit (FIGS. 1 to 6 and 13 and 14) having a spindle of a commercially high compact polystyrene and constructed in accordance with the principles of the invention, had the following characteristics:

| Dielectric Constant of Rotor and Stator Material | Minimum Capacitance in pF | Full Capacitance in pF |
| --- | --- | --- |
| 6.5 | 0.8 | 1.8 |
| 22 | 0.8 | 4 |
| 57 | 1 | 6 |
| 90 | 2 | 10 |

I claim:

1. In a subminiature disc type trimmer capacitor, having a conductively coated ceramic stator; a conductively coated ceramic rotor; means rotatably connecting the stator and the rotor; the improvement comprising the stator body terminating in an integral base part having a pair of thickened metal coatings directly applied thereon and insulated from one another, at least one of said coatings being integral with and part of the conductive coating of the stator, both of said coatings providing the connection for the capacitor.

2. A miniature trimmer, for use in a differential circuit arrangement, as claimed in claim 1, wherein said means connecting the stator and the rotor is a plastic spindle, said stator has a pair of metal coatings, both disposed on the same side of the stator and separated from one another by an insulating gap.

3. A miniature trimmer as claimed in claim 1, wherein said means connecting the rotor and the stator is a metal spindle, said stator has a pair of metal coatings, each on opposite plane surfaces of the stator, and each substantially half-covering the stator surfaces, means electrically rotatably connecting one stator coating to said metal spindle, the other said coating being spaced from said spindle by an insulating gap.

4. A miniature trimmer as claimed in claim 1, wherein the outer, narrow sides of the stator base part, bearing said two thickened connection coatings, are tapered, whereby the flat sides of the coating surfaces will have trapezoidal form.

5. A miniature trimmer as claimed in claim 1, wherein the stator base part disposed between the two thickened connection coatings is a compact block, the central portion of said block having its bottom edge in alignment with the connection coatings and forming an uncoated insulating gap.

6. A miniature trimmer as claimed in claim 1, wherein the stator base part disposed between the two thickened connection coatings is recessed, leaving a pair of projecting feet.

7. Sub-miniature trimmer capacitor comprising a flat ceramic disc body having an essentially circular region and an integral, projecting attachment region; a first metallized coating located on one side of said disc body covering essentially half of said circular region, and further extending over a portion of said projecting region, said coating forming one capacitor electrode; and a terminal integral therewith a second, metallized coating covering essentially the other half of said circular region and further extending over another portion of said projecting region and insulated from said first coating said metallized coating extension over said projecting region forming another terminal integral therewith; a circular rotor disc member having an essentially semi-circular metal coating; and assembly means associated with said rotor disc member and said flat ceramic disc body movably securing said circular rotor disc member and said circular region of said disc body in stacked relation.

8. A sub-miniature trimmer capacitor as claimed in claim 7, wherein both said metallized coatings are on the same side of said disc body.

9. A sub-miniature trimmer capacitor as claimed in claim 7, wherein said metallized coatings are on opposite sides of said disc body, and said assembly means are electrically conductive and in electrical contact with said metal coating on the rotor and with one of said metallized coatings on the disc body.

10. A sub-miniature trimmer capacitor as claimed in claim 7, wherein said metallized coatings extend around a portion of the side edge of said projecting region.

11. A sub-miniature trimmer capacitor as claimed in claim 7, wherein said projecting region is of decreasing width as the distance from the circular region increases, whereby a tapered insertion foot is formed.

References Cited by the Examiner

UNITED STATES PATENTS

| | | | |
|---|---|---|---|
| 2,591,705 | 4/1952 | Kodama | 317—249 |
| 2,707,272 | 4/1955 | Blitz. | |
| 2,850,681 | 9/1958 | Horton. | |
| 2,913,645 | 11/1959 | Hansen et al. | 317—249 |

FOREIGN PATENTS 566,986  1/1945  Great Britain.

OTHER REFERENCES

Meyer et al.; German printed application, No. 1,124,605, pub. 3/1/62.

LARAMIE E. ASKIN, *Primary Examiner.*

ROBERT K. SCHAEFER, *Examiner.*

D. J. BADER, *Assistant Examiner.*